(12) United States Patent
Brown

(10) Patent No.: US 7,654,042 B1
(45) Date of Patent: Feb. 2, 2010

(54) CABLE TIE DOWN SYSTEM

(76) Inventor: Daryl Brown, 3313 Maple La., Haines City, FL (US) 33844

(*) Notice: Subject to any disclaimer, the term of this patent is extended or adjusted under 35 U.S.C. 154(b) by 102 days.

(21) Appl. No.: 11/707,177

(22) Filed: Feb. 14, 2007

Related U.S. Application Data

(60) Provisional application No. 60/746,342, filed on May 3, 2006.

(51) Int. Cl.
  E04B 7/00 (2006.01)
  E04B 7/04 (2006.01)
(52) U.S. Cl. ............................... 52/23; 52/93.2; 52/94; 52/96
(58) Field of Classification Search ............... 52/23, 52/4, 93.2, 94, 96, 156, 166, 169.9, 148, 52/292; 248/499, 500
  See application file for complete search history.

(56) References Cited

U.S. PATENT DOCUMENTS

| | | | | |
|---|---|---|---|---|
| 1,864,403 A | * | 3/1932 | Bradley | 403/213 |
| 3,335,531 A | * | 8/1967 | Grimelli et al. | 52/23 |
| 3,769,764 A | * | 11/1973 | Young | 52/23 |
| 3,943,670 A | * | 3/1976 | Miller | 52/23 |
| 5,355,640 A | * | 10/1994 | Frye | 52/23 |
| 5,491,935 A | * | 2/1996 | Coxum | 52/92.2 |
| 5,537,786 A | * | 7/1996 | Lozier et al. | 52/23 |
| 5,623,788 A | * | 4/1997 | Bimberg et al. | 52/23 |
| 5,687,512 A | * | 11/1997 | Spoozak et al. | 52/23 |
| 5,983,572 A | * | 11/1999 | Laboy | 52/23 |
| 6,134,858 A | * | 10/2000 | Gutelius et al. | 52/698 |
| 6,161,339 A | * | 12/2000 | Cornett et al. | 52/23 |
| 6,269,593 B1 | * | 8/2001 | Thompson | 52/23 |
| 2004/0118053 A1 | * | 6/2004 | Huppert | 52/23 |

* cited by examiner

Primary Examiner—Richard E Chilcot, Jr.
Assistant Examiner—Mark R Wendell
(74) Attorney, Agent, or Firm—Louis J. Brunoforte

(57) ABSTRACT

A lower support is provided between the side edges of the roof beneath. The lower support is in contact with the roof adjacent to the exterior edge. Upper supports are provided above and in contact with the roof. The upper supports include upper exterior, interior and intermediate supports. The upper exterior support is adjacent to the exterior edge. The upper interior support is adjacent to the interior edge. Central supports extend between the interior and exterior edges of the roof. The lower support is provided below and the upper supports are provided above. The central supports are located above and in contact with the roof. In this manner lower intersections are formed with the upper exterior and lower exterior and central supports. Upper intersections are formed with the upper interior and the central supports. Central intersections are formed with the upper intermediate and central supports.

2 Claims, 3 Drawing Sheets

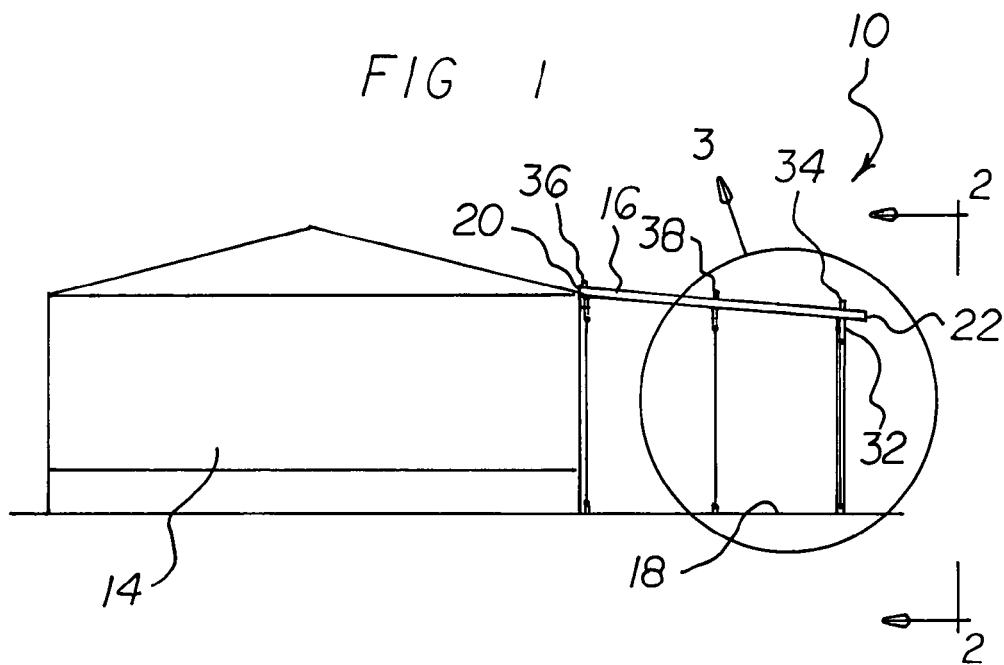
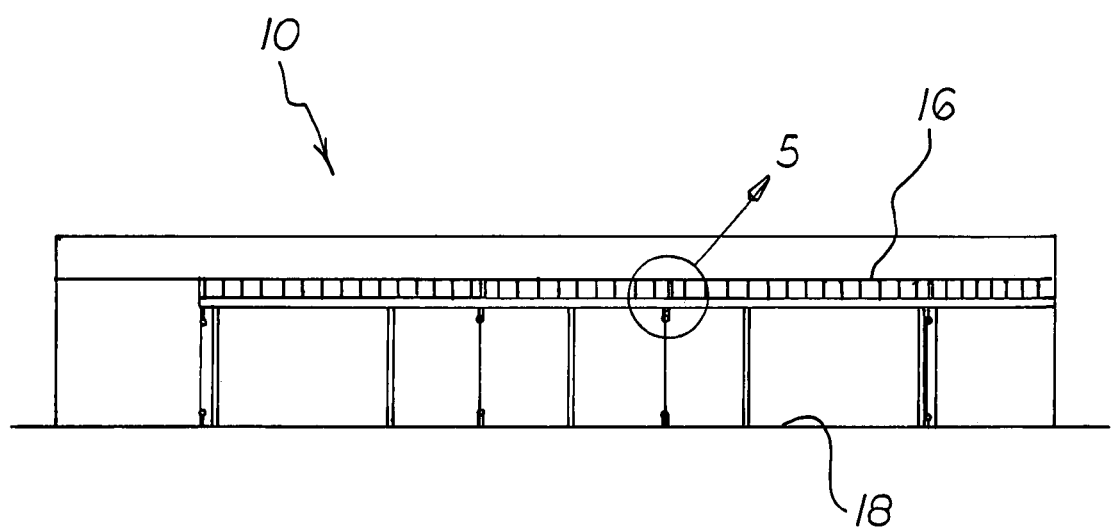

CABLE TIE DOWN SYSTEM

RELATED APPLICATION

The present Non-Provisional Patent Application is based upon Provisional Patent Application Ser. No. 60/746,342 filed May 3, 2006, the subject matter of which is incorporated herein by reference.

BACKGROUND OF THE INVENTION

1. Field of the Invention

The present invention relates to a cable tie down system and more particularly pertains to holding down aluminum car ports, screen rooms and like structures during high winds to abate damage in a reliable and economical manner.

2. Description of the Prior Art

The use of support systems of known designs and configurations is known in the prior art. More specifically, support systems of known designs and configurations previously devised and utilized for the purpose of securing structures through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,335,531 issued Aug. 15, 1967 to Grimelli relates to Tie-Down House Trailers or the Like. U.S. Pat. No. 3,769,764 issued Nov. 6, 1973 to Young relates to a Mobile Home Holdown Apparatus. U.S. Pat. No. 3,943,670 issued Mar. 16, 1976 to Miller relates to an Anchor System for Mobile Homes and Similar Structures. U.S. Pat. No. 5,537,786 issued Jun. 23, 1996 to Lozier relates to a Hurricane-Resisting Building Roof Structure Tie-Down. U.S. Pat. No. 5,355,640 issued Oct. 18, 1994 to Frye relates to an Anchor System for Completed Structures. U.S. Pat. No. 5,491,935 issued Feb. 20, 1996 to Coxum relates to a Roof Anchor System. U.S. Pat. No. 5,623,788 issued Apr. 29, 1997 to Bimberg relates to a Roof Anchoring System. U.S. Pat. No. 5,687,512 issued Nov. 18, 1997 to Spoozak relates to a Hurricane Lock Down System. U.S. Pat. No. 5,983,572 issued Nov. 16, 1999 to Laboy relates to a Roof Tie-Down Support Member. Lastly, U.S. Pat. No. 6,269,593 issued Aug. 7, 2001 to Thompson relates to a Roof Tie Down Connecting Fork and Yoke.

While these devices fulfill their respective, particular objectives and requirements, the aforementioned patents do not describe a cable tie down system that allows holding down aluminum car ports, screen rooms and like structures during high winds to abate damage in a reliable and economical manner.

In this respect, the cable tie down system according to the present invention substantially departs from the conventional concepts and designs of the prior art, and in doing so provides an apparatus primarily developed for the purpose of holding down aluminum car ports, screen rooms and like structures during high winds to abate damage in a reliable and economical manner.

Therefore, it can be appreciated that there exists a continuing need for a new and improved cable tie down system which can be used for holding down aluminum car ports, screen rooms and like structures during high winds to abate damage in a reliable and economical manner. In this regard, the present invention substantially fulfills this need.

SUMMARY OF THE INVENTION

In view of the foregoing disadvantages inherent in the known types of support systems of known designs and configurations now present in the prior art, the present invention provides an improved cable tie down system. As such, the general purpose of the present invention, which will be described subsequently in greater detail, is to provide a new and improved cable tie down system and method which has all the advantages of the prior art and none of the disadvantages.

To attain this, the present invention essentially comprises a cable tie down system. First provided is a structure. The structure has a laterally extending roof above. The structure has a cement pad below the roof. The roof has a linear interior edge. The linear interior edge is secured to the structure. The roof has a free parallel linear exterior edge. The roof has parallel linear side edges. The side edges are provided between the interior and exterior edges. The interior edge is at a higher elevation than the exterior edge. In this manner the side edges for an angle of less that 30 degrees from the horizontal. The roof is fabricated of a plurality of roofing segments. The roofing segments are of generally rigid aluminum sheet metal. The roofing segments are formed with upstanding vertical end sections. The roofing segments are formed with co-planar main sections. The main sections are provided between the upstanding end sections. The end sections are at right angles with respect to the main sections. In this manner a bight is formed. The end sections are about 3 inches in height. The main sections are about 12 inches in width. The main sections have a length of several times greater than the width.

A lower support is provided. The lower support is fabricated of rigid aluminum tubing. The lower support has a rectangular cross sectional configuration. The lower support is about 2 inches wide. The lower support is at least 3 inches high. The lower support has a length. The lower support extends between the side edges of the roof. The lower support is located beneath and in contact with the roof adjacent to the exterior edge.

Provided next is a plurality of upper supports. The upper supports are fabricated of rigid aluminum tubing. The upper supports are provided in a rectangular cross sectional configuration. The upper supports are about 2 inches wide. The upper supports are at least 2 inches high. The upper supports have a length. The upper supports extend between the side edges of the roof. The upper supports are located above and in contact with the roof. The upper supports include an upper exterior support. The upper exterior support is provided adjacent to the exterior edge of the roof. The upper supports include an upper interior support. The upper interior support is provided adjacent to the interior edge of the roof. The upper supports include an upper intermediate support. The upper intermediate support is provided essentially mid-way the upper exterior and interior supports.

Further provided is a plurality of central supports. The central supports are fabricated of rigid aluminum tubing. The central supports have a rectangular cross sectional configuration. The central supports are about 2 inches wide. The central supports are about 3 inches high. The central supports have a length. The centrals supports are between the interior and exterior edges of the roof. The upper support is provided above. The lower support is provided below. The central supports are located above and are in contact with the roof adjacent to bights between the main and end sections of the roof panels. The central supports are spaced apart between about 5 and 15 feet. In this manner the central supports form lower intersections with the upper exterior and lower exterior supports. Also in this manner the central supports form upper intersections with the upper interior support. Further in this manner the central supports form central intersections with the upper intermediate support.

Provided last is a plurality of connectors. The connectors include upper long eye bolts. The upper long eye bolts are about 14 inch long. The upper long eye bolts are 0.5 inched in diameter. The upper long eye bolts extend through the lower intersections. The connectors include a downwardly extending eye. The downwardly extending eye is provided below. The connectors include a nut. The nut is provided above. The plurality of connectors includes upper short eye bolts. The upper short eye bolts are about 8 inch long. The upper short eye bolts are 0.5 inched in diameter. The upper short eye bolts extend through the lower intersections. The connectors include a downwardly extending eye. The downwardly extending eye is provided below. The connectors include a nut. The nut is provided above.

The plurality of connectors includes a plurality of concrete lead heads. The concrete lead heads are about 3 inches long. The concrete lead heads are 0.5 inches in diameter. The connectors include an upwardly extending eye. The upwardly extending eye is located beneath the eyes of the long and short eye bolts. The plurality of connectors includes a plurality of cables. The cables are about 0.25 inches in diameter. Each cable includes an upper loop and upper clamp. The upper loop and upper clamp are connected to an upper eye and a lower loop. Each cable includes a lower clamp. The lower clamp is connected to a lower eye.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cable tie down system which has all of the advantages of the prior art support systems of known designs and configurations and none of the disadvantages.

It is another object of the present invention to provide a new and improved cable tie down system which may be easily and efficiently manufactured and marketed.

It is further object of the present invention to provide a new and improved cable tie down system which is of durable and reliable constructions.

An even further object of the present invention is to provide a new and improved cable tie down system which is susceptible of a low cost of manufacture with regard to both materials and labor, and which accordingly is then susceptible of low prices of sale to the consuming public, thereby making such cable tie down system economically available to the buying public.

Even still another object of the present invention is to provide a cable tie down system for holding down aluminum car ports, screen rooms and like structures during high winds to abate damage in a reliable and economical manner.

Lastly, it is an object of the present invention to provide a new and improved cable tie down system. A lower support is provided between the side edges of the roof beneath. The lower support is in contact with the roof adjacent to the exterior edge. Upper supports are provided above and in contact with the roof. The upper supports include upper exterior, interior and intermediate supports. The upper exterior support is adjacent to the exterior edge. The upper interior support is adjacent to the interior edge. Central supports extend between the interior and exterior edges of the roof. The lower support is provided below and the upper supports are provided above. The central supports are located above and in contact with the roof. In this manner lower intersections are formed with the upper exterior and lower exterior and central supports. Upper intersections are formed with the upper interior and the central supports. Central intersections are formed with the upper intermediate and central supports.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a cable tie down system constructed in accordance with the principles of the present invention.

FIG. 2 is a side elevational view of the system taken along line 2-2 of FIG. 1.

The same reference numerals refer to the same parts throughout the various Figures.

DESCRIPTION OF THE PREFERRED EMBODIMENT

Figures 3, 4:
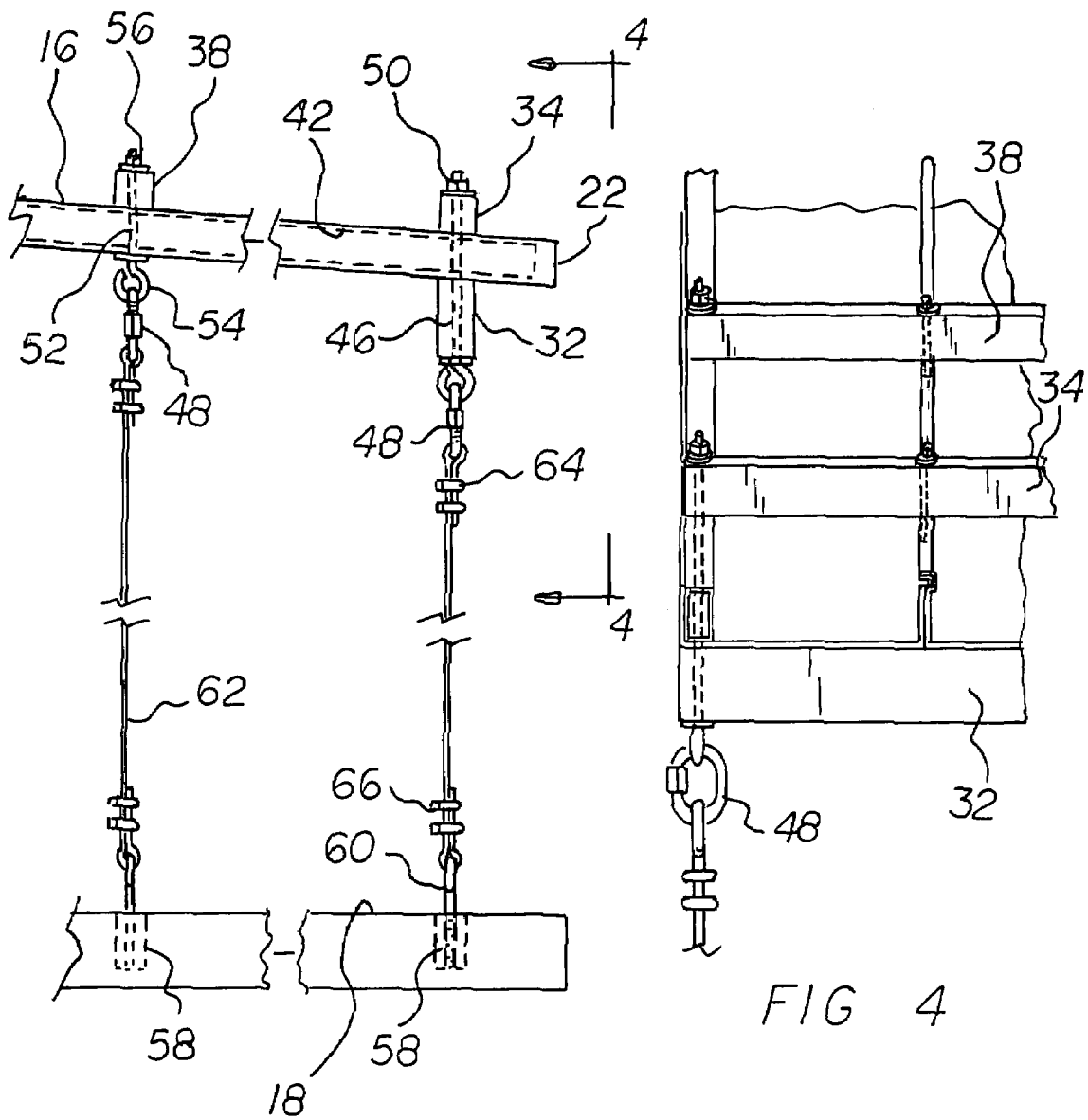
FIG. 3 is an enlarged front elevational view of the system taken at circle 3 of FIG. 1.
FIG. 4 is a side elevational view of the system taken along line 4-4 of FIG. 3.
Figure 5:
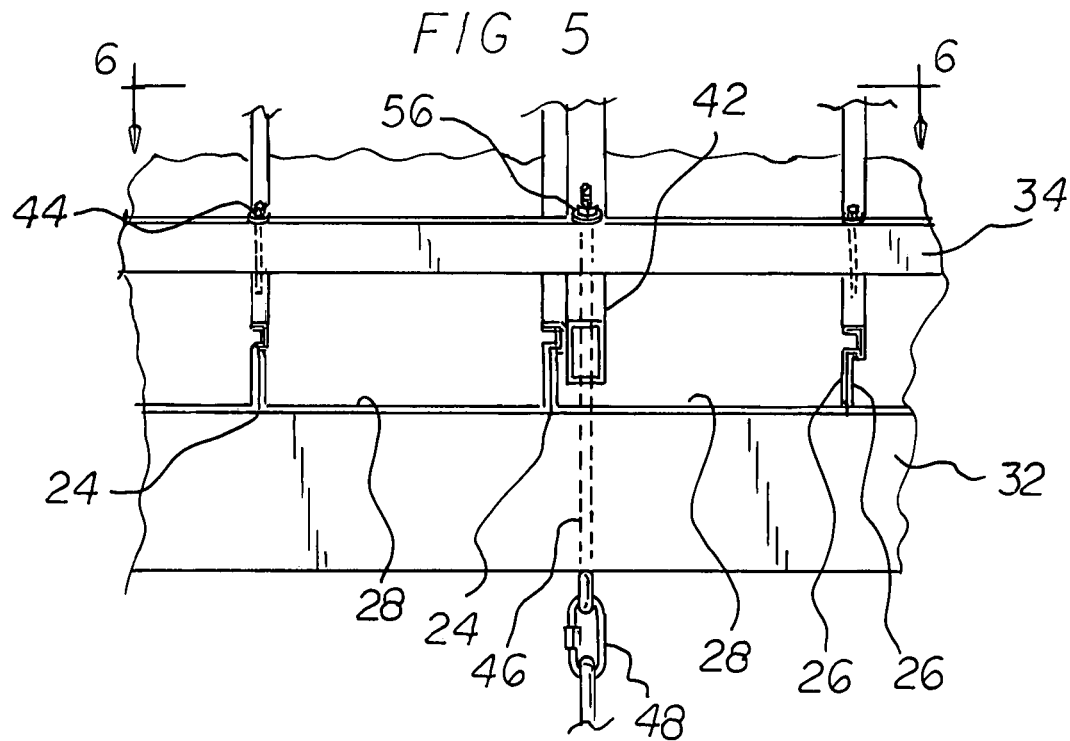
FIG. 5 is an enlarged side elevational view of the system taken at circle 5 of FIG. 2.
Figure 6:
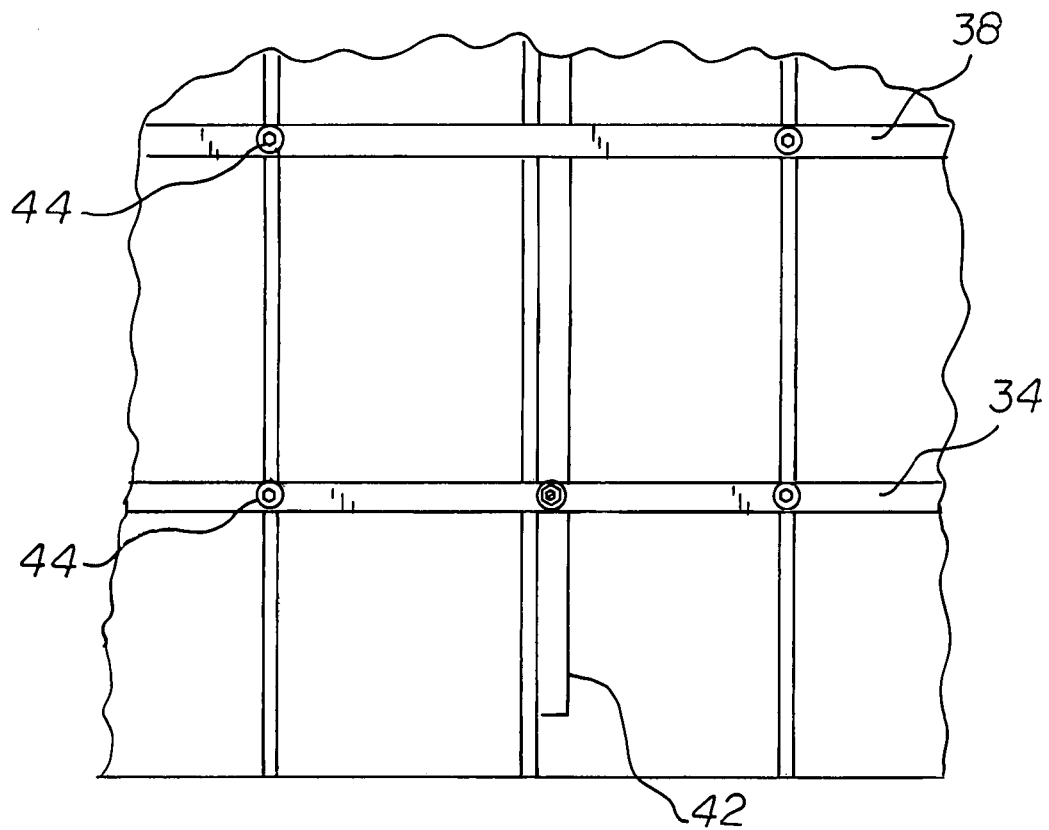
FIG. 6 is a plan view of the system taken along line 6-6 of FIG. 5.

With reference now to the drawings, and in particular to FIG. 1 thereof, the preferred embodiment of the new and improved cable tie down system embodying the principles and concepts of the present invention and generally designated by the reference numeral 10 will be described.

The present invention, the cable tie down system 10 is comprised of a plurality of components. Such components in their broadest context include a lower support, upper supports and central supports. Such components are individually configured and correlated with respect to each other so as to attain the desired objective.

First provided is a structure 14. The structure has a laterally extending roof 16 above. The structure has a cement pad 18 below the roof. The roof has a linear interior edge 20. The linear interior edge is secured to the structure. The roof has a free parallel linear exterior edge 21. The roof has parallel linear side edges 22. The side edges are provided between the interior and exterior edges. The interior edge is at a higher elevation than the exterior edge. In this manner the side edges for an angle of less that 30 degrees from the horizontal. The roof is fabricated of a plurality of roofing segments 24. The roofing segments are of generally rigid aluminum sheet metal. The roofing segments are formed with upstanding vertical end sections 26. The roofing segments are formed with co-planar main sections 28. The main sections are provided between the upstanding end sections. The end sections are at right angles with respect to the main sections. In this manner a bight is formed. The end sections are about 3 inches in height. The main sections are about 12 inches in width. The main sections have a length of several times greater than the width.

A lower support 32 is provided. The lower support is fabricated of rigid aluminum tubing. The lower support has a rectangular cross sectional configuration. The lower support is about 2 inches wide. The lower support is at least 3 inches high. The lower support has a length. The lower support extends between the side edges of the roof. The lower support is located beneath and in contact with the roof adjacent to the exterior edge.

Provided next is a plurality of upper supports 34, 36, 38. The upper supports are fabricated of rigid aluminum tubing. The upper supports are provided in a rectangular cross sectional configuration. The upper supports are about 2 inches wide. The upper supports are at least 2 inches high. The upper supports have a length. The upper supports extend between the side edges of the roof. The upper supports are located above and in contact with the roof. The upper supports include an upper exterior support 34. The upper exterior support is provided adjacent to the exterior edge of the roof. The upper supports include an upper interior support 36. The upper interior support is provided adjacent to the interior edge of the roof. The upper supports include an upper intermediate support 38. The upper intermediate support is provided essentially mid-way between the upper exterior and interior supports.

Further provided is a plurality of central supports 42. The central supports are fabricated of rigid aluminum tubing. The central supports have a rectangular cross sectional configuration. The central supports are about 2 inches wide. The central supports are about 3 inches high. The central supports have a length. The centrals supports extend between the upper and lower edges of the roof. The upper supports are provided above. The lower support is provided below. The central supports are located above the roof. The central supports are in contact with the roof adjacent to bights between the main and end sections of the roof panels. The central supports are spaced apart between about 5 and 15 feet. In this manner the central supports form lower intersections with the upper exterior and lower exterior supports. Also in this manner the central supports form upper intersections with the upper interior support. Further in this manner the central supports form central intersections with the upper intermediate support.

Additional rigidity is provided to the system by utilizing sheet metal screws 44 and associated washers. Such screws extend downwardly through periodic upper supports and into horizontal upper regions of the upstanding vertical sections of the roofing segments.

Provided last is a plurality of connectors. The connectors include upper long eye bolts 46. The upper long eye bolts are about 14 inch long. The upper long eye bolts are 0.5 inched in diameter. The upper long eye bolts extend through the lower intersections. The connectors include a downwardly extending eye 48. The downwardly extending eye is provided below. The connectors include a nut 50. The nut is provided above. The plurality of connectors includes upper short eye bolts 52. The upper short eye bolts are about 8 inch long. The upper short eye bolts are 0.5 inched in diameter. The upper short eye bolts extend through the lower intersections. The connectors include a downwardly extending eye 54. The downwardly extending eye is provided below. The connectors include a nut 56. The nut is provided above.

The plurality of connectors includes a plurality of concrete lead heads 58. The concrete lead heads are about 3 inches long. The concrete lead heads are 0.5 inches in diameter. The connectors include an upwardly extending eye 60. The upwardly extending eye is located beneath the eyes of the long and short eye bolts. The plurality of connectors includes a plurality of cables 62. The cables are about 0.25 inches in diameter. Each cable includes an upper loop and upper clamp 64. The upper loop and upper clamp are connected to an upper eye and a lower loop. Each cable includes a lower clamp 66. The lower clamp is connected to a lower eye.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable tie down system for a structure including a laterally extending roof having interior, exterior and side edges:
    a lower support between the side edges of the roof beneath and in contact with the roof adjacent to the exterior edge;

upper supports above and in contact with the roof including an upper exterior support adjacent to the exterior edge and an upper interior support adjacent to the interior edge and an upper intermediate support;

central supports extending between the interior and exterior edges of the roof with the lower support below and the upper supports above, the central supports being located above and in contact with the roof thus forming lower intersections with the upper exterior and lower exterior supports and thus forming upper intersections with the upper interior support and thus forming central intersections with the upper intermediate support;

a plurality of connectors including upper long eyes extending through the lower intersections with downwardly extending eyes below and nuts above, the plurality of connectors including upper short eye bolts extending through the lower intersections with downwardly extending eyes below and a nuts; and a plurality of concrete lead heads with upwardly extending eyes located beneath the eyes of the long and short eye bolts with a plurality of cables, each cable including an upper loop and upper clamp connected to an upper eye and a lower loop and lower clamp connected to a lower eye.

2. A cable tie down system for holding down aluminum car ports and screen rooms during high winds to abate damage in a reliable and economical manner comprising, in combination:

a structure with a laterally extending roof above and a cement pad below the roof, the roof having a linear interior edge secured to the structure and a free parallel linear exterior edge with parallel linear side edges between the interior and exterior edges, the interior edge being at a higher elevation than the exterior edge whereby the side edges for an angle of less that 30 degrees from the horizontal, the roof being fabricated of a plurality of roofing segments of generally rigid aluminum sheet metal, the roofing segments being formed with upstanding vertical end sections and co-planar main sections between the upstanding end sections, the end sections being at right angles with respect to the main sections thus forming a bight, the end sections being about 3 inches in height and the main sections being about 12 inches in width with a length of several times greater than the width;

a lower support fabricated of rigid aluminum tubing with a rectangular cross sectional configuration about 2 inches wide and at least 3 inches high and a length extending between the side edges of the roof, the lower support being located beneath and in contact with the roof adjacent to the exterior edge;

a plurality of upper supports fabricated of rigid aluminum tubing with a rectangular cross sectional configuration about 2 inches wide and at least 2 inches high and a length extending between the side edges of the roof, the upper supports being located above and in contact with the roof, the upper supports including an upper exterior support adjacent to the exterior edge of the roof and an upper interior support adjacent to the interior edge of the roof and an upper intermediate support essentially midway the upper exterior and interior supports;

a plurality of central supports fabricated of rigid aluminum tubing with a rectangular cross sectional configuration about 2 inches wide and about 3 inches high and a length extending between the upper and lower edges of the roof with the upper support above and the lower supports below, the central supports being located above and in contact with the roof adjacent to bights between the main and end sections of the roof panels and spaced apart between about 5 and 15 feet, the central supports thus forming lower intersections with the upper exterior and lower exterior supports, the central supports thus forming upper intersections with the upper interior support, the central supports thus forming central intersections with the upper intermediate support; and a plurality of connectors including upper long eye bolts about 14 inch long and 0.5 inches in diameter extending through the lower intersections with a downwardly extending eye below and a nut above, the plurality of connectors including upper short eye bolts about 8 inch long and 0.5 inched in diameter extending through the lower intersections with a downwardly extending eye below and a nut above, the plurality of connectors including a plurality of concrete lead heads about 3 inches long and 0.5 inches in diameter with an upwardly extending eye located beneath the eyes of the long and short eye bolts, the plurality of connectors including a plurality of cables about 0.25 inches in diameter, each cable including an upper loop and upper clamp connected to an upper eye and a lower loop and lower clamp connected to a lower eye.

* * * * *